(12) United States Patent
Cam-Winget et al.

(10) Patent No.: US 7,631,347 B2
(45) Date of Patent: Dec. 8, 2009

(54) SYSTEM AND METHOD FOR MULTI-SESSION ESTABLISHMENT INVOLVING DISJOINT AUTHENTICATION AND AUTHORIZATION SERVERS

(75) Inventors: Nancy Cam-Winget, Mountain View, CA (US); Mark Krischer, Pymble (AU); Jeremy Stieglitz, Menlo Park, CA (US)

(73) Assignee: Cisco Technology, Inc., San Jose, CA (US)

(*) Notice: Subject to any disclaimer, the term of this patent is extended or adjusted under 35 U.S.C. 154(b) by 867 days.

(21) Appl. No.: 11/283,554

(22) Filed: Nov. 18, 2005

(65) Prior Publication Data

US 2006/0236383 A1    Oct. 19, 2006

Related U.S. Application Data

(63) Continuation-in-part of application No. 11/098,253, filed on Apr. 4, 2005, now Pat. No. 7,562,224.

(51) Int. Cl.
*G06F 7/04* (2006.01)

(52) U.S. Cl. ........................................................ 726/8

(58) Field of Classification Search ............ 726/4, 726/8
See application file for complete search history.

(56) References Cited

U.S. PATENT DOCUMENTS

| 7,213,145 | B2* | 5/2007 | Sasmazel | 713/153 |
|---|---|---|---|---|
| 7,447,775 | B1* | 11/2008 | Zhu et al. | 709/226 |
| 2003/0163733 | A1 | 8/2003 | Barriga-Caceres et al. | |
| 2003/0237004 | A1* | 12/2003 | Okamura | 713/201 |
| 2004/0054905 | A1* | 3/2004 | Reader | 713/171 |
| 2007/0064647 | A1* | 3/2007 | Prasad | 370/331 |
| 2009/0207819 | A1* | 8/2009 | Kroselberg et al. | 370/338 |

* cited by examiner

*Primary Examiner*—Jung Kim
*Assistant Examiner*—Samson B Lemma
(74) *Attorney, Agent, or Firm*—Tucker Ellis & West LLP

(57) ABSTRACT

A system and method that supports disjoint authentication server farms and disjoint policy or authorization servers for multi-session establishment. The authentication server has global knowledge of authenticators for additional sessions for a supplicant and can split authentication requests as needed to different authentication servers. The split authentication and authorization requests can be aggregated should the other authentication and authorization servers have the capability to handle multiple requests. In the case of server farms, authentication and implied authorization requests can be split to facilitate load balancing.

20 Claims, 5 Drawing Sheets

SYSTEM AND METHOD FOR MULTI-SESSION ESTABLISHMENT INVOLVING DISJOINT AUTHENTICATION AND AUTHORIZATION SERVERS

CROSS-REFERENCE TO RELATED APPLICATIONS

This application is a continuation-in-part of U.S. application Ser. No. 11/098,253, filed on Apr. 4, 2005, now U.S. Pat No. 7,562,224 hereby incorporated by reference.

BACKGROUND OF THE INVENTION

The present invention relates generally to a system and method for multi-session establishment for a single device.

Network security has become a business critical issue. As a result, there is a need for different applications and systems to authenticate to one another. These authentications occur in an isolated context and result in the establishment of multiple, secure, authenticated sessions.

For example, in the wireless context, an access point may run several different applications or subsystems. As a result, there is a need for the access point to authenticate several times. When multiplied across a network comprising hundreds of access points, this can significantly load the AAA (Authentication, Authorization and Accounting) servers.

Existing single sign-on systems tend to be an optimization on the user side, eliminating the need for the user to continuously log into different applications by hiding subsequent authentications from the user. Typically, the user performs a single login to "unlock" access to secure credentials. These credentials are then used by the single sign-on system to authenticate the user to other applications as required. For example, Kerberos, available from the Massachusetts Institute of Technology and many other commercial products, authenticate a user to a ticketing server. The user requests tickets for each application the user would like to use. When the user starts an application, the tickets are used to establish a secure session with each application by the single sign-on system. The user's device submits the ticket to the authenticator for the application, the authenticator then authenticates the ticket with the ticketing server. Thus, the device is still performing multiple authentications, even though authentications to applications are hidden from the user by the single sign-on system.

U.S. application Ser. No. 11/098,253 describes a method wherein a single device with multiple subsystems—each subsystem requiring authentication to a different authenticator, may authenticate all such subsystems in a single transaction. The device aggregates the multiple authentication requests and submits them through the primary authenticator to the authentication server. The authentication server would validate the individual subsystems and send the resultant keys to each authenticator.

However, a shortcoming of the aforementioned method is that it assumes that the infrastructure has only a single authentication server. Many networks have a server farm of AAA (Authentication, Authorization and Accounting) servers. In other, more complex cases, there could be disjoint or "shattered" AAA servers with different information stored on different AAA server farms. Furthermore, complex networks may employ authorization or policy servers which contain knowledge about what is permissible for a given client or entity. The authorization servers may be separate from the authentication server. Even in the case where a single authentication server is used to authenticate the client only once, the authentication server must still verify that the device is authorized to be served by each of the subsystems.

BRIEF SUMMARY OF THE INVENTION

In accordance with an aspect of the present invention, there is disclosed herein a system and method that enables multi-session authentication requests to be split as needed between different authentication servers. In one embodiment the authentication server acts as a proxy for the other authenticators and sends requests to the disjoint authentication servers. Alternatively, the authentication server has global knowledge of other authenticators and can split the requests as needed to different authentication servers. Aggregation of the split requests can be used if any of the authentication servers are capable of handling multiple requests.

In accordance with an aspect of the present invention, there is disclosed herein a method for multi-session establishment by an authentication server. The method comprises receiving an authentication request for a supplicant from an authenticator for the supplicant. A determination is made whether there is at least one other session for the supplicant. The at least one other session for the supplicant with is initiated with a server for the at least one other session.

In accordance with an aspect of the present invention, there is disclosed herein an authentication server configured in accordance with an aspect of the present invention. The authentication server is configured for receiving an authentication request for a supplicant from an authenticator for the supplicant. The authentication server is configured to be responsive to the authentication request to initiate at least one other session for the supplicant with a server for the at least one other session.

In accordance with an aspect of the present invention, there is disclosed herein an authentication server. The authentication server comprising means for receiving an authentication request for a supplicant from an authenticator for the supplicant. The authentication server further comprising means for determining at least one other session for the supplicant and means for initiating the at least one other session for the supplicant with a server for the at least one other session.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. An aspect of the present invention is that it supports disjoint authentication server farms and disjoint policy or authorization servers. An aspect of the present invention is that it supports a system where different authenticators are actually supported by disjoint authentication servers, allowing the initial authentication server receiving the request to act as a proxy where a different authentication server services the request. An aspect of the present invention is that it supports a system where the authentication server is actually a server farm and for load balancing purposes the aggregated requests can be split among different individual servers. An aspect of the present invention supports a system where the authentication server obtains specific policy information from other (single or multiple) authorization server(s) from the different authenticators.

For example, Cisco Access Points, available from Cisco Technology, Inc., 170 West Tasman Drive, San Jose, Calif. 95134, contain multiple subsystems which need to authenticate to different authenticators. In large vertical environments, where large number of access points may come online simultaneously, this creates a huge burden on the AAA server infrastructure.

Figure 1:
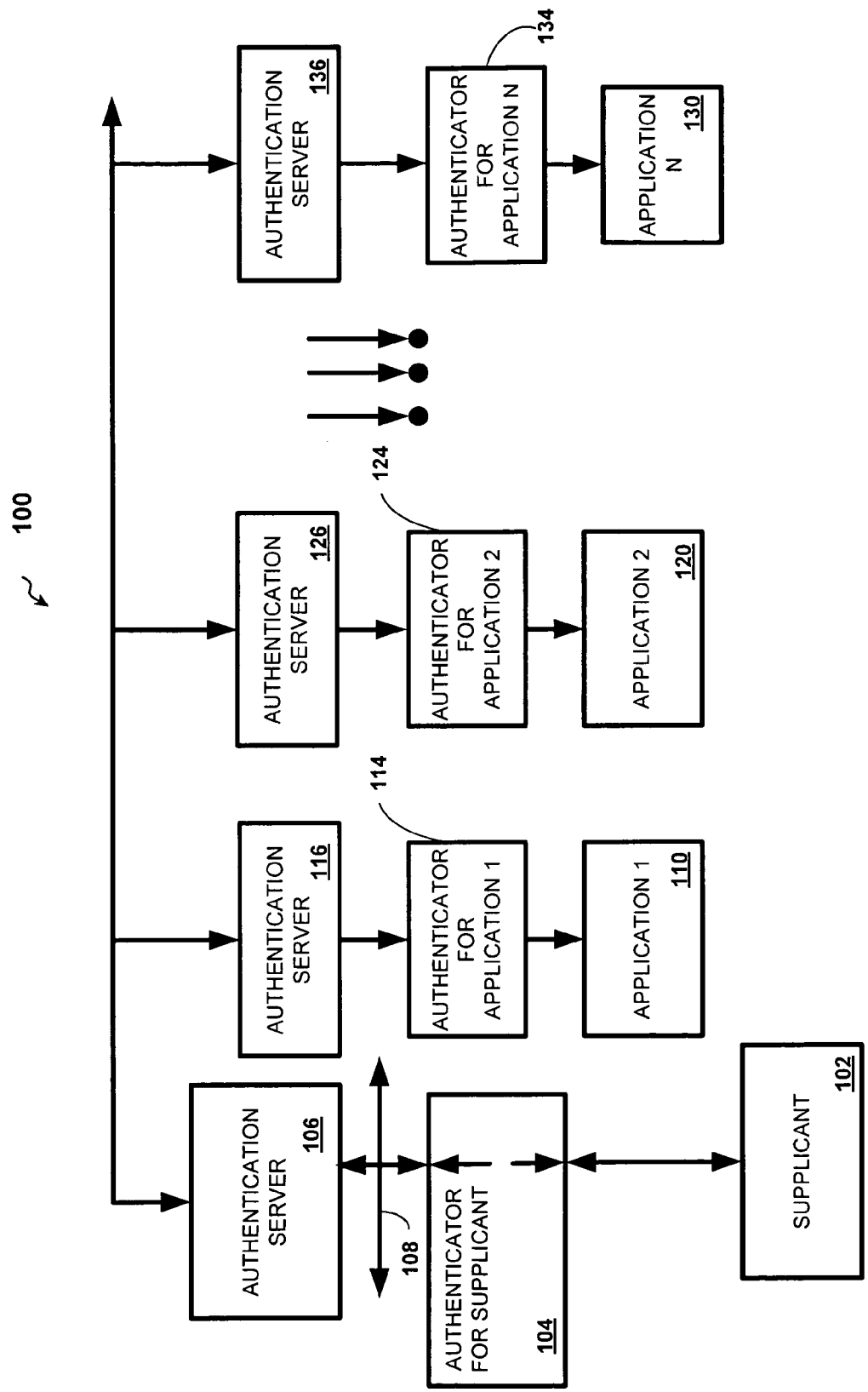
FIG. 1 is an exemplary network wherein an authentication server proxies authentication requests to additional authentication servers.

FIG. 1 is an exemplary network 100 wherein an authentication server 106 proxies authentication requests to additional authentication servers 116, 126, 136. Supplicant 102 initiates a session by sending a request to authenticator 104. Supplicant 102 communicates bi-directionally with authenticator 104. In a preferred embodiment, supplicant 102 is a client desiring access to a network 108 (e.g. a distribution network) via authenticator 104. Authenticator 104 communicates bi-directionally with authentication server 106. In a preferred embodiment, authentication server 106 is a AAA (Authentication, Authorization and Accounting) server, such as a RADIUS (Remote Authentication Dial-in User Service, RFC 2865) server.

When supplicant 102 first connects with the network, authenticator 104 has logic that only allows authentication request messages to be passed between supplicant 102 and authentication server 106. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Until supplicant 102 is authenticated, sessions with application 1, 110, application 2, 120, ..., application N, 130, are inhibited by logic in authenticator 104. When authentication server 106 authenticates supplicant 102, logic in authentication server 106 sends keying material for the session to authenticator 104 and supplicant 102.

In addition, either concurrent with the authentication process or as a separate process, logic in authentication server 106 determines at least one other session for supplicant 102, e.g., application 1, 110, application 2, 120, ..., application N, 130. In one embodiment, logic in supplicant 102 sends a list of additional sessions to the authentication server 106, for example added as Information Elements (IEs) as part of the message. Alternatively, authentication server 106 utilizes logic to retrieve a database entry for the server from a database accessible to the authentication server. The database preferably resides on authentication server 106, but can reside elsewhere as long as it is accessible by authentication server 106.

There are several ways in which the sessions are generated from a single authentication contemplated by the present invention. The present invention contemplates that the method and means employed are understood by both the supplicant and the network infrastructure. Thus, the supplicant signals either authenticator 104 or authentication server 106 that it desires to establish these multiple sessions. Alternative embodiments are based upon whether the policy decision is made by authenticator 104 or the authentication server 106. But the logic is the same, that is, for example in the case of the supplicant being an AP, the AP must signal agreement of this through an added element to the 802.1X EAP authentication, the EAP method itself or it can be implicitly understood that all it's authentications will yield the multiple sessions. Authenticator 104 or authentication server 106 confirm that the AP is authorized to establish the multiple sessions before it initiates the multi-session establishment.

As authentication server 106 determines there is at least one other session for supplicant 102, authentication server 106 acts as a proxy and initiates a session with an authenticator server for the at least one other session, such as an authentication server 116 for application 1, 110, authentication server 126 for application 2, 120, ..., and authentication server 136 for application N, 130. Thus, to establish the at least one other session with one or more of applications 110, 120, 130, authentication server 106 communicates with the corresponding authentication server 116, 126, 136 as opposed to the authenticator 114, 124, 134.

The sessions are established by generating unique new keying material that is passed to each session. This can be accomplished by any one of several suitable techniques. For example, authentication server 106 can issue the keys and distribute them to both the supplicant 104 and applications 110, 120, 130 via their authentication servers 116, 126, 136 respectively. As another example, the keys can be derived by the authentication server 116, 126, 136 for the corresponding application 110, 120, 130, which would then distribute the key for the supplicant to authentication server 106 and the corresponding key for the application 110, 120, 130 to the application 110, 120, 130.

The following is an example of how network 100 can be utilized to support a large network. In this example supplicant 102 is a wireless access point (AP) and authenticator 104 is a wireless switch. When the supplicant (AP) 102 powers up, it contacts authenticator 104 to access distribution network 108. Authenticator 104 forwards the access request to authentication server 106. Authentication server 106 authenticates supplicant 102 (i.e. verifies who supplicant is) and determines whether supplicant 102 is authorized to access network 108.

In addition, if supplicant (AP) 102 needs to access additional applications (e.g. applications 110, 120, 130) then either supplicant (AP) sends a list of applications to authentication server 106 (e.g. via IEs coupled to the access request) or 15 authentication server 106 determines what other applications supplicant 102 is authorized to access. Authentication server 106 then communicates with the authentication server associated with the application(s) (e.g. authentication servers 116, 126, 136 for applications 110, 120, 130 respectively). Keying material for the sessions between supplicant 102 and one or more of applications 110, 120, 130 can be generated by either authentication server 106, the authentication server 116, 126, 136 associated with the application 110, 120, 130, or can be mutually derived between authentication server 106 and the authentication server 116, 126, 136 associated with the application 110, 120, 130 respectively.

Figure 2:
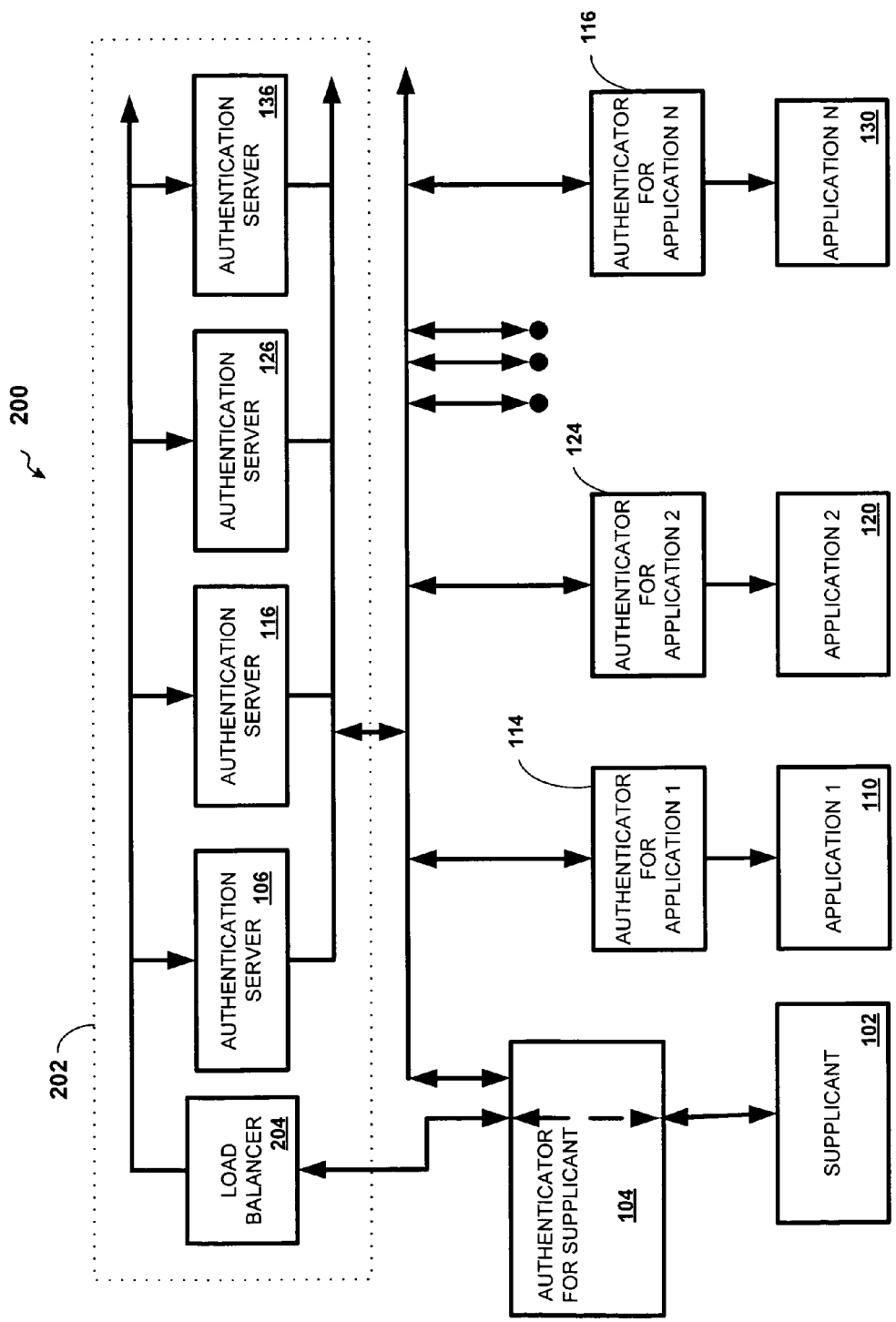
FIG. 2 is an exemplary network employing a server farm of authentication servers.

FIG. 2 is an exemplary network 200 employing a server farm 202 of authentication servers. In this example, supplicant 102 sends a request to access a network to authenticator 104. Authenticator 104 forwards the request to server farm 202, where one of authentication servers 106, 116, 126, 136 handles the request. Optionally, server farm 202 can employ a load balancer 204. Load balancer 204 comprises logic for determining the load on authentication servers 106, 116, 126, 136 and directs the authentication request to one of authentication servers 106, 1126, 126, 136 based on their current load.

In the server farm example, any one of authentication servers 106, 116, 126, 136 can act as an authentication server for authenticator 104 and/or for applications 110, 120, 130. Furthermore, if an authentication server 106, 116, 126, 136 determines that its load is at a threshold level (e.g. at capacity or a certain 5 percentage of capacity), it can pass off the request from supplicant 102 to another authentication server 106, 116, 126, 136. In addition, the authentication server 106, 116, 126 136 handling the authentication request for supplicant 102 does not have to be the same server that initiates the session with one or more of applications 110, 120, 130.

As an example, if supplicant 102 is attempting to access network 200 and requires access to application N 130, authenticator 104 passes the request to server farm 202 where one of authentication servers 106, 116, 126, and 136 process the request from supplicant 102. For example, authentication server 106 can handle the request from supplicant 102. Authentication server 106 can determine that is supplicant 102 has to establish a session with one of applications 110, 120, 130 (application 130 in this example). Authentication server 106 can determine this either by examining the request sent by supplicant 102 (e.g. a list can be attached, for example using TLVs) or using other means (e.g. a database accessible by authentication server 106). Authentication server 106 can initiate the session with supplicant 102 and application 130, or authentication server 106 can communicate with one of authentication serves 116, 126, 136 to initiate the session. Once the session has been initiated, keys can be exchanged between supplicant 102 and application 130. If authentication server 106 initiated the session, it can exchange both keys. If another authentication server, e.g. one of servers 116, 126, 136, initiated the session, that server can pass one key to the application 130 and the other key to authentication server 106 which forwards it to supplicant 102.

Figure 3:
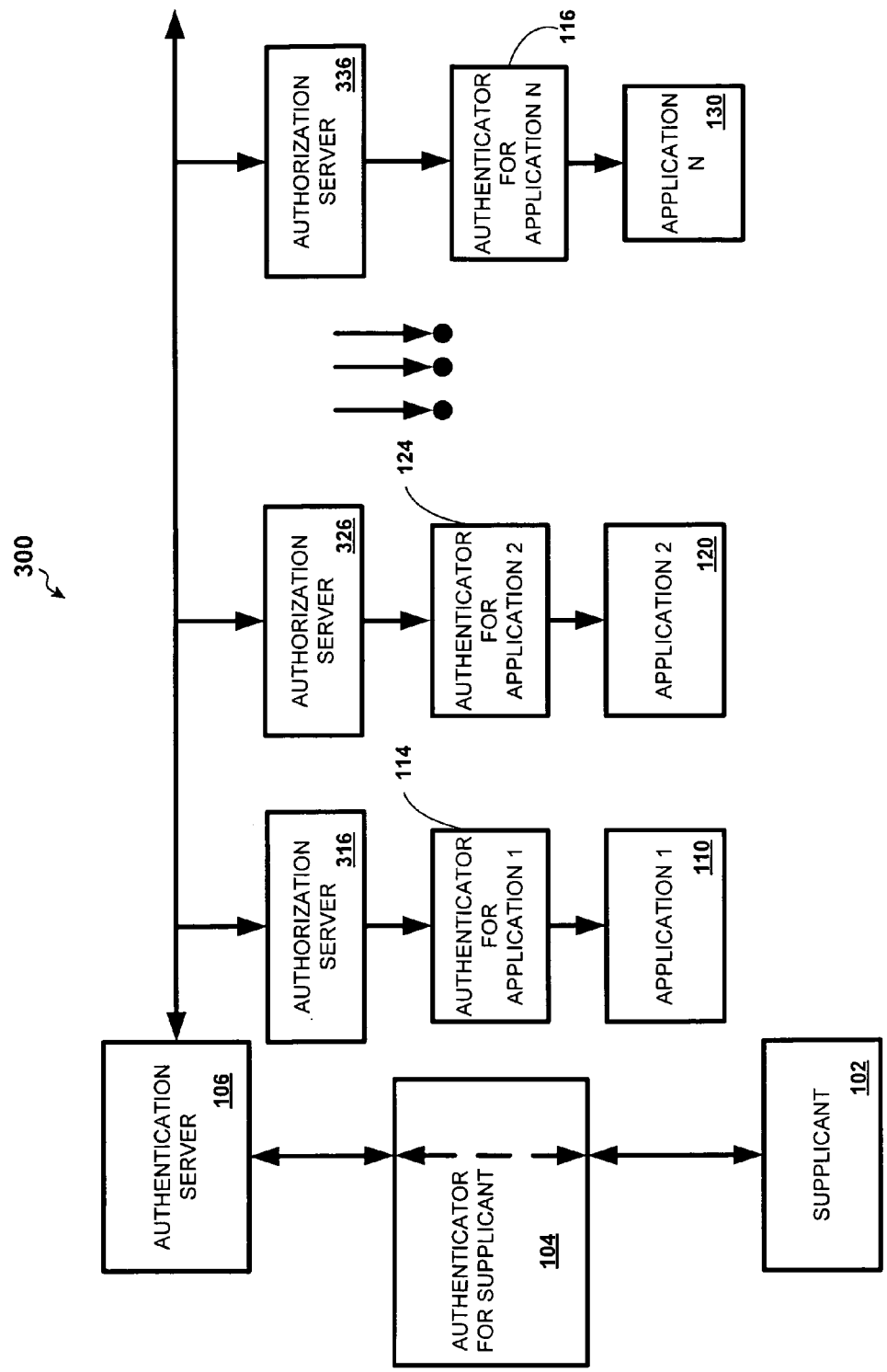
FIG. 3 is an exemplary network employing an authentication server and multiple authorization servers.

FIG. 3 is an exemplary network 300 employing an authentication server and multiple authorization (or policy) servers 316, 326, 336. In this example, supplicant 102 contacts authenticator 104 to request access to network 300. Authenticator 104, which authenticates supplicant 102, authenticates supplicant 102 with authentication server 106. Authentication server 106 then determines whether to establish additional sessions for supplicant 102, for example with one or more of applications 110, 120, 130. However, in this example, authentication server 106 authenticates supplicant 102, but authorization (or policy) servers 316, 326, 336 are employed to determine whether supplicant 102 is authorized for applications 110, 120, 130 respectively.

Thus, when authentication server 106 determines that additional sessions are being requested with one or more of applications 110, 120, 130 for supplicant 102, authentication server 106 determines via the corresponding authorization (or policy) server 316, 326, 336 whether supplicant 102 is authorized to access the application 110, 120, 130. Supplicant 102 can request access to applications 110, 120, 130 via a TLV or a list attached to its request to access network 300. Alternatively, authentication server 106 can maintain (or have access to) a database for determining additional sessions for supplicant 102.

Figure 4:
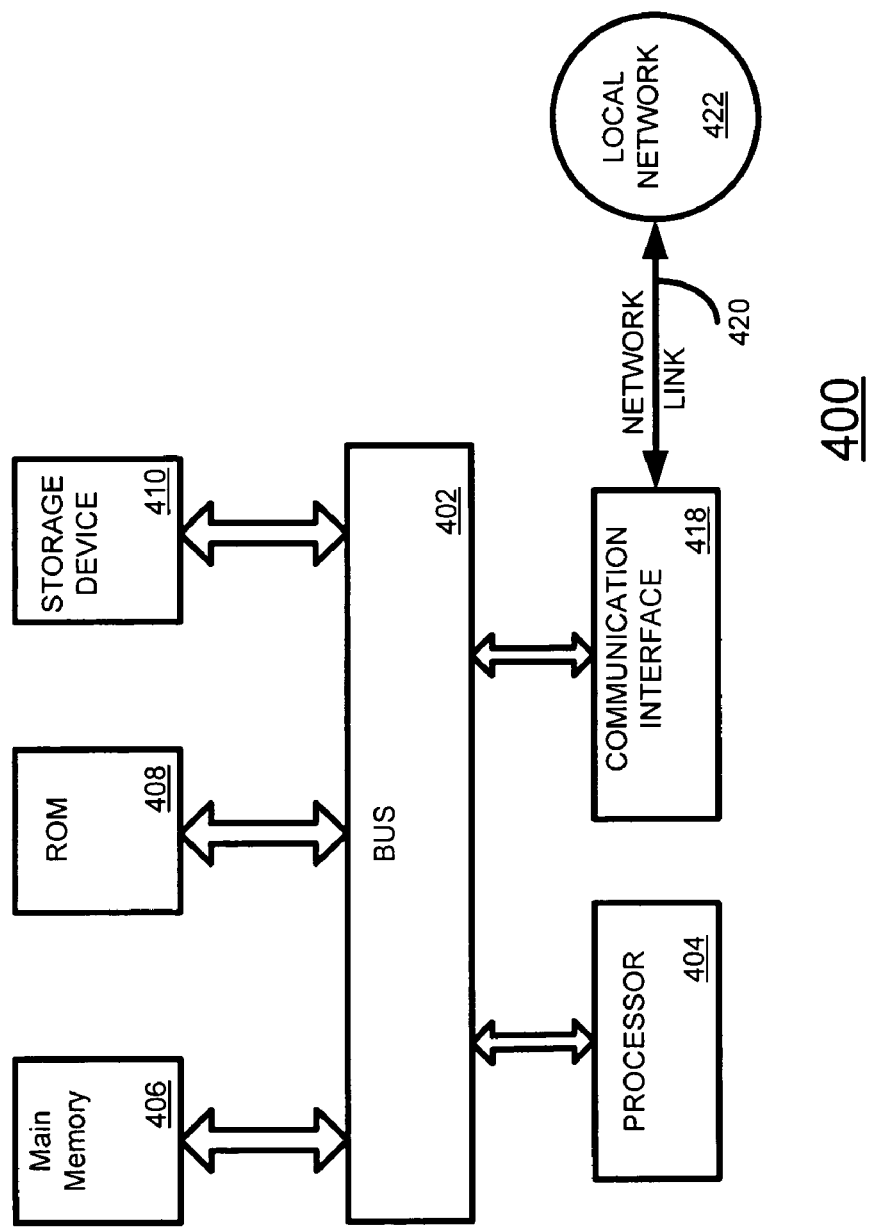
FIG. 4 is a block diagram of a computer system for implementing an aspect of the present invention.

FIG. 4 is a block diagram of a computer system 400 for implementing an aspect of the present invention. For example, computer system 400 is suitable to be employed by at least one of supplicant 102, authenticator 104, authentication servers 106, 116, 126, 136 application 1, 110, application 2, 120, . . . , and application N, 130 of FIG. 1, and, load balancer 202 of FIG. 2 and/or authorization servers 316, 326, 336 of FIG. 3.

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the invention is related to the use of computer system 400 for multi-session establishment for a client involving disjoint authentication and/or authorization servers. According to one embodiment of the invention, multi-session establishment for a client involving disjoint authentication and/or authorization servers is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry or an ASIC may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 44 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to other computers (not shown), authentication servers, and/or applications (see FIGS. 1-3).

Computer system 400 can send messages and receive data, including program codes, network link 420, and communication interface 418. The received code may be executed by processor 404 as it is received, and/or stored in storage device 410, or other non-volatile storage for later execution. In this manner, computer system 400 may obtain application code in the form of a carrier wave.

Figure 5:
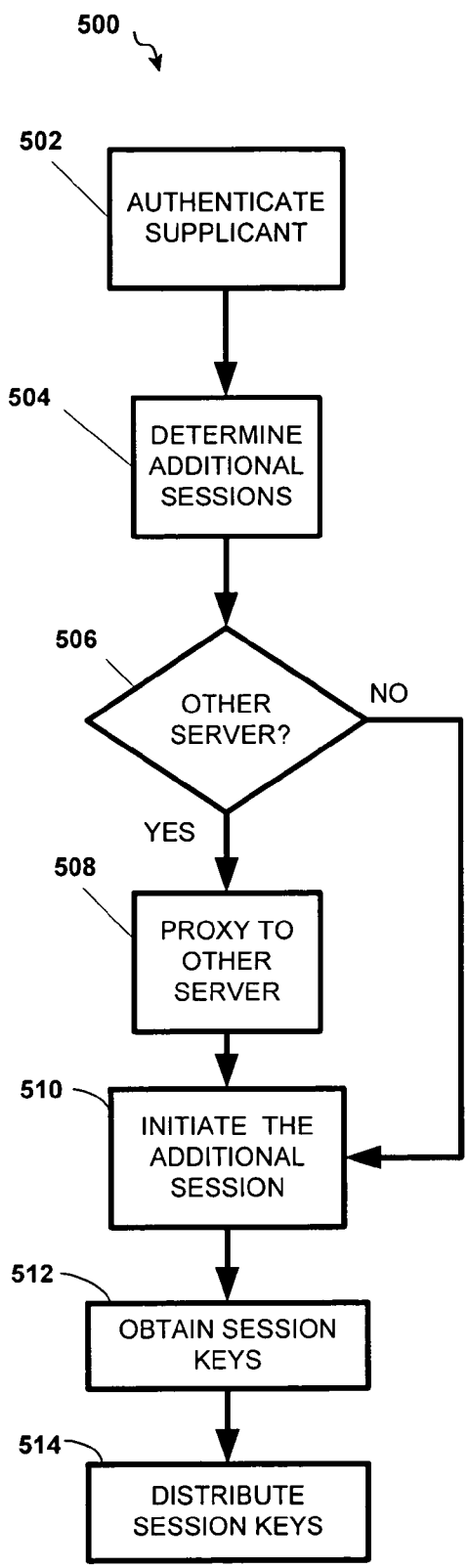
FIG. 5 is a block diagram of a methodology for multi-session establishment.

In view of the foregoing structural and functional features described above, a methodology in accordance with various aspects of the present invention will be better appreciated with reference to FIGS. 4 and 5. While, for purposes of simplicity of explanation, the methodology of FIGS. 4 and 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 5 is a block diagram of a methodology 500 for multi-session establishment involving disjoint authentication and/or authorization servers. At 502, the supplicant is authenticated. The supplicant is authenticated by an authentication server that receives a request from an authenticator to authenticate the supplicant.

At 504, a determination is made whether the supplicant requires additional sessions. There are several techniques that can be employed to make this determination. For example, the supplicant can request that the additional sessions be initiated, e.g., via a list attached to its request to access the network, or via an IE. As another example, the network infrastructure can store a list of applications for the supplicant, e.g., a database accessible by the authentication server.

At 506, the authentication server determines whether it needs (or should) communicate with another server. For example, if the authentication server is part of a server farm and the authentication server's load is reaching a critical load point, the authentication between the supplicant and the additional session can be off loaded and performed by another authentication server. Alternatively, if the authentication server is part of a server farm and reaching a critical load point, another authentication server in the server farm can perform the authentications for the supplicant and for the additional sessions.

In other embodiments, one or more of the application for additional sessions may have an associated authentication server. A remote application for example would likely have its own authentication server.

Furthermore, in other embodiments, one or more of the applications for additional sessions may have associated authorization or policy servers. In these embodiments, the authentication server verifies (authenticates) the supplicant. The authentication server then verifies with the authorization or policy servers whether the supplicant is authorized to access the application.

If at 508 it is determined that at least one other server is needed for the additional session (YES), at 508 the authentication server proxies to the other server and communicates with the other server for the supplicant. Except for when authentication servers are changed for load balancing, communication with the other server for authentication and/or authorization for the supplicant are exchanged between the servers. Otherwise (NO), 510 is performed.

At 510, the additional session is initiated. This may entail authentication of the supplicant, authorization of the supplicant or both. If the additional session requires keys, they are then generated by the appropriate authentication and/or authorization server. At 512, the keys for the additional session are obtained by the authentication server for the supplicant.

At 514, the keys are distributed. If an additional or disjoint server is involved in the additional session, the additional or disjoint server can distribute keys to the application and to the authentication server for the supplicant. The authentication server for the supplicant would then forward the session key for the additional application to the supplicant. The authentication server for the supplicant can forward the key for the additional application to the supplicant along with the session keys established by the authentication server for the supplicant, or the keys can be sent separately.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for multi-session establishment by an authentication server, comprising:
   receiving, by a first authentication server, an authentication request for a supplicant from an authenticator for the supplicant;
   determining, by the first authentication server, at least one other session for the supplicant; and
   initiating, by the first authentication server, the at least one other session for the supplicant with a second authentication server for the at least one other session;
   wherein the first authentication server is configured act as a proxy server for the second authentication server.

2. A method according to claim 1, wherein the authentication request for the supplicant comprises a list of the at least one other session.

3. A method according to claim 1, further comprising determining that the supplicant is authorized for the at least one other session.

4. A method according to claim 1, the determining at least one other session further comprising retrieving a database entry for the supplicant, the database entry comprising a list of at least one other session for the supplicant.

5. A method according to claim 1, the initiating at least one other session further comprises:
   receiving keying data from the server for the at least one other session; and
   forwarding the keying data to the supplicant.

6. A method according to claim 5, the forwarding keying data to the supplicant further comprises forwarding keying data for establishing a session between the supplicant and the authenticator for the supplicant with the keying data for the at least one other session.

7. A method according to claim 1, wherein the supplicant is a wireless access point and the authenticator for the supplicant is a wireless switch coupling the access point to a distribution network.

8. A method according to claim 1, further comprising forwarding the authentication request to another authentication server.

9. A method according to claim 1, wherein the server for the at least one other session is one of the group consisting of an authentication server and an authorization server.

10. An authentication server, comprising:
    the authentication server configured for receiving an authentication request for a supplicant from an authenticator for the supplicant;
    the authentication server is configured to be responsive to the authentication request to initiate at least one other session for the supplicant with a second authentication server for the at least one other session; and
    the authentication server is configured to act as a proxy server for the second authentication server.

11. An authentication server to claim 10, wherein the authentication server is configured to obtain from the authentication request a list of the at least one other session.

12. An authentication server according to claim 10, further comprising the authentication server configured for determining that the supplicant is authorized for the at least one other session.

13. An authentication server according to claim 12, the determining at least one other session further comprising retrieving a database entry for the supplicant, the database entry comprising a list of at least one other session for the supplicant.

14. An authentication server according to claim 12, the authentication server is further configured to verify the supplicant is authorized for the at least one other session by accessing an authorization server for the at least one other session.

15. An authentication server according to claim 10, further comprising the authentication server configured to forward the authentication request to another authentication server based on a predetermined condition.

16. An authentication server according to claim 10, wherein the server for the at least one other session is one of the group consisting of an authentication server and an authorization server.

17. An authentication server, comprising:
    means for receiving an authentication request for a supplicant from an authenticator for the supplicant;
    means for determining at least one other session for the supplicant;
    means for initiating the at least one other session for the supplicant with a second authentication server for the at least one other session; and
    means for acting as a proxy server for the second authentication server.

18. An authentication server according to claim 17, further comprising means for determining that the supplicant is authorized for the at least one other session.

19. An authentication server according to claim 17, the means for initiating at least one other session further comprises:
    means for receiving keying data from the server for the at least one other session; and
    means for forwarding the keying data to the supplicant.

20. An authentication server according to claim 17, wherein the server for the at least one other session is one of the group consisting of an authentication server and an authorization server.

* * * * *

UNITED STATES PATENT AND TRADEMARK OFFICE
CERTIFICATE OF CORRECTION

PATENT NO.     : 7,631,347 B2                                Page 1 of 1
APPLICATION NO. : 11/283554
DATED          : December 8, 2009
INVENTOR(S)    : Cam-Winget et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Twenty-first Day of December, 2010

David J. Kappos
*Director of the United States Patent and Trademark Office*